Oct. 18, 1955
R. L. DILLS
2,721,280
ELECTRIC DRIVING MEANS
Filed April 28, 1953
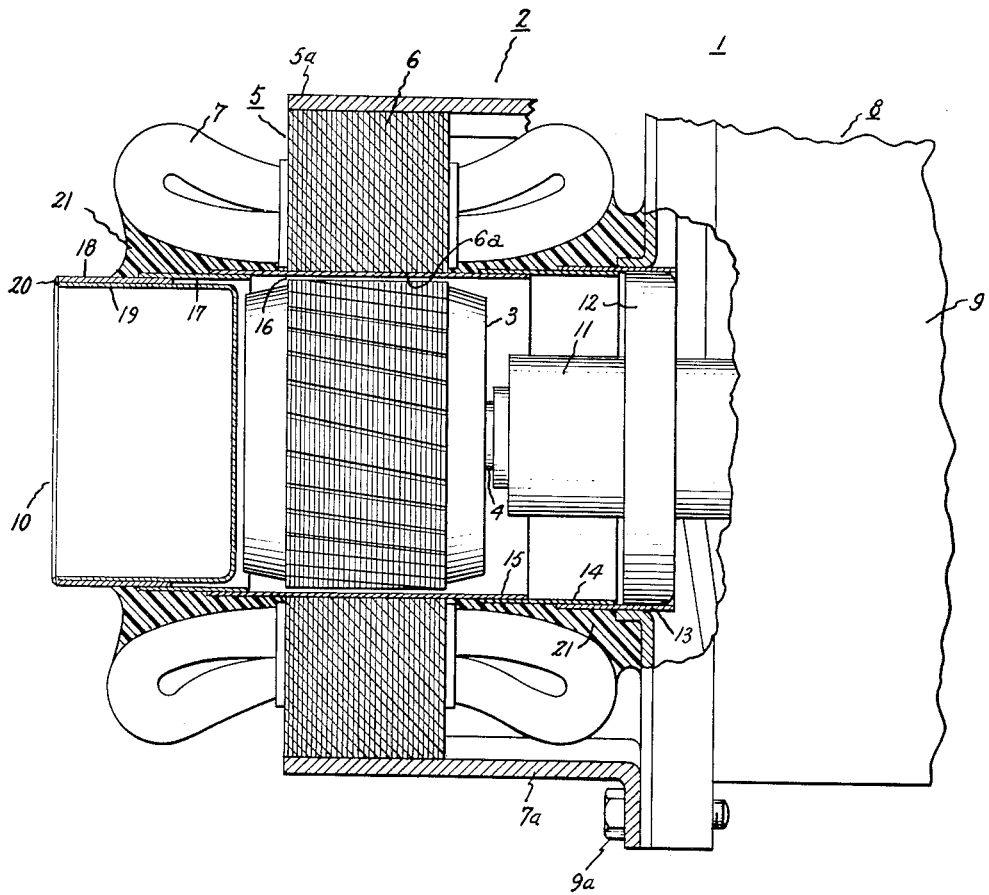
Inventor:
Raymond L. Dills,
by *[signature]*
His Attorney.

United States Patent Office 2,721,280
Patented Oct. 18, 1955

2,721,280

ELECTRIC DRIVING MEANS

Raymond L. Dills, Erie, Pa., assignor to General Electric Company, a corporation of New York Application April 28, 1953, Serial No. 351,634

8 Claims. (Cl. 310—86)

My invention relates to apparatus including electric drive motors and pertains more particularly to apparatus including a motor rotor hermetically sealed in a case with equipment to be driven and an externally mounted motor stator adapted for cooperating with and thereby effecting rotation of the rotor through the case.

When an encased rotor is rotated through cooperation with an externally mounted stator a portion of the case enclosing the rotor and the equipment thereby driven is disposed in the air gap between the rotor and stator. For this arrangement to operate with a minimum of eddy current and hysteresis losses it is desirable that the portion of the case in the air gap be formed of a nonmagnetic material having high electrical resistivity. In order further to minimize such losses and to arrive at an arrangement wherein the motor is adapted for operating as efficiently as possible, it is additionally desirable that the portion of the case disposed in the air gap be as thin as possible, i. e., it is desirable to reduce the thickness of this portion of the case to the point where the motor efficiency is not substantially less than when operating with nothing in the air gap. Heretofore, however, attempts to reduce substantially the thickness of the portion of the case in the air gap have resulted in intolerable weakening of the case.

The primary object of my invention is to provide in apparatus including a case enclosed motor rotor and an externally mounted motor stator new and improved means for increasing the operating efficiency of the motor.

Another object of my invention is to provide in apparatus including a case enclosed motor rotor and an externally mounted motor stator new and improved means for reducing the minimum thickness to which the portion of the case disposed between the rotor and stator may be reduced.

Further advantages of my invention will become apparent as the following description proceeds and the features of novelty which characterize my invention will be pointed out with particularity in the claims annexed to and forming part of this specification.

In carrying out the objects of my invention I provide a motor rotor, a cooperating stator and a case including a sleeve construction housing the rotor. The sleeve construction comprises a plurality of jointed sleeves which are progressively thinner toward a cylindrical shim forming the middle of the sleeve construction. The shim is pressed into the stator bore and is formed of a high strength non-magnetic material having high electrical resistivity. Formed between the sleeve construction and the stator is an insulative bond which seals the sleeve joints and provides structural support for the sleeve construction.

For a better understanding of my invention, reference may be had to the accompanying drawing illustrating a preferred embodiment of my invention incorporated in a motor-compressor assembly.

Referring to the drawing, there is partially shown a motor-compressor assembly generally designated 1. The assembly 1 includes an electrical drive motor 2. The motor 2 comprises a rotor 3, including a drive shaft 4, and a stator 5, including a plurality of laminations 6 formed to provide a stator bore 6a and motor windings generally designated 7. The assembly 1 further includes a hermetically sealed case generally designated 8. The case 8 includes a head portion 9 adapted for housing a compressor (not shown) or any other equipment which it is desired to be operated in a sealed case and driven by the motor 2.

Provided for supporting the stator 5 from the head portion 9 of the case is a stator band 5a. The stator band 5a is formed to include a plurality of arms 7a adapted for being secured by a corresponding plurality of screws 9a (only one of which is shown) to the head portion of the case. This arrangement provides support for the stator without adversely affecting cooling thereof. The case 8 further includes a cylindrical portion 10 housing the rotor 3.

Provided for supporting the rotor shaft 4 is a bearing sleeve 11 suitably supported by a collar 12 in the end of the cylindrical portion 10 of the case adjacent the head portion 9.

The cylindrical portion 10 of the case is of a sleeve construction comprising a plurality of jointed sleeves. A first sleeve 13 having a thickness of approximately $\frac{1}{16}$ of an inch is fitted tightly in an opening in the head portion 9 of the case. Additionally, the sleeve 13 receives and has suitably secured therein the above-mentioned collar 12. Fitted tightly in the end of the sleeve 13 opposite the collar 12 is a second sleeve 14 which is approximately .015 of an inch thick.

Press fitted in the stator bore 6a is a third sleeve or cylindrical shim 15. The shim 15 has a thickness of approximately .005 of an inch and extends to either side of the air gap, indicated by 16, between the rotor and stator. On one side of the air gap 16 the shim 15 is tightly fitted in the end of the second sleeve 14 opposite the first sleeve. On the other side of the air gap 16 the shim 15 receives and has tightly fitted therein a fourth sleeve 17 which, like the second sleeve 14, is approximately .015 of an inch thick. Tightly fitted in the end of the fourth sleeve 17 opposite the shim is a fifth sleeve 18, which like the first sleeve 13 is approximately $\frac{1}{16}$ of an inch thick.

Fitted in the fifth sleeve 18 is a reentrant cup 19, the complete edge of which is welded as at 20 to the outer edge of the fifth sleeve 18 thereby to provide a satisfactory seal therebetween. The cup 19, like the sleeves 14 and 17, is approximately .015 of an inch thick.

In the just described sleeve construction at least the shim 15 is formed of a non-magnetic material having a high coefficient of electrical resistivity. Additionally, as mentioned above, the shim 15 is only approximately .005 of an inch thick. These characteristics of the material of which the shim 15 is formed and the thinness of the shim effectively minimize eddy current and hysteresis losses to the point where the motor efficiency is not substantially less than if the motor were operating with nothing in the air gap 16. In other words, the shim 15 is formed of a material and is of a thinness satisfactory for minimizing eddy current and hysteresis losses of the stator and rotor. For optimum performance all of the members comprising the sleeve construction may be formed of non-magnetic material having a high coefficient of electrical resistivity.

The materials which I have found most satisfactory for forming the shim 15 have been chrome-nickel, stainless steel and the high silicon electrical steels. The silicon content of the latter type should be approximately 2.5% or more. Additionally, the just mentioned types of steels have proved exceptionally satisfactory in that they are high strength materials permitting the forming of the shim 15 to a .005 of an inch thickness which can be pressed into the stator bore 6a.

Provided for sealing the joints between the several sleeves comprising the sleeve construction and between the first sleeve 13 and the head portion 9 of the case 8 is an electrically insulative bond 21. The bond 21 additionally secures the various sleeves comprising the sleeve construction or the rotor housing portion 10 of the case to the windings 7 of the motor stator. Thus, the sleeve construction including the shim 15 is structurally supported by the motor stator and specifically the stator windings 7. It is this structural support of the sleeve construction by the stator windings which permits the use of a shim of such thinness as .005 of an inch. In other words, when support for the shim is provided through the bond and stator it is not required that the shim be sufficiently thick to be self-supporting. This enables the employment of a shim which is too thin to be self-supporting and is of such thinness as to result in current losses of only little more than those resulting from just a required air gap. Thus, it is possible for the motor 5 of the assembly 1 to operate at a degree of efficiency approaching as closely as possible that of a similar motor operating with nothing in the air gap 16.

I prefer forming the bond 21 by pouring a liquid thermosetting resin, such as an epoxy or ethoxylene resin, in the windings 7 and in and around the teeth (not shown) of the stator laminations 6. Thus, the windings 7 are bonded into a solid mass to which the sleeve construction is secured and thereby supported. It will be seen that while I prefer forming the bond 21 with epoxy resin, any electrically insulating material which is suitably strong, leaktight, chemically inert and does not age may be used for the bond. For instance, if it is so desired a ceramic bond may be employed.

It will be seen that by my invention apparatus including a case enclosed rotor and an externally mounted cooperating stator may be so constructed that the portion of the case in the air gap between the rotor and stator effects almost as little current loss as just the air gap, resulting in greater motor operating efficiency in such apparatus.

While I have shown and described a specific embodiment of my invention, I do not desire my invention to be limited to the particular form shown and described and I intend by the appended claims to cover all modifications within the spirit and scope of my invention.

What I claim as new and desire to secure by Letters Patent of the United States is:

1. In an electrical motor driving arrangement a rotor, a cooperating stator, a case, said case including a sleeve construction housing said rotor, said sleeve construction comprising a plurality of jointed sleeves, one of said sleeves being disposed between said stator and rotor, said one sleeve at least being formed of a material and being of a thinness satisfactory for minimizing current losses, said one sleeve being too thin to be self-supporting, and electrically insulating means effective for sealing the joints of said sleeve construction and securing said sleeves to said stator thereby to provide structural support for said sleeve construction.

2. In an electrical motor driving arrangement a rotor, a cooperating stator, a case, said case including a sleeve construction housing said rotor, said sleeve construction comprising a plurality of jointed sleeves, one of said sleeves being disposed between said stator and rotor, said one sleeve at least being formed of a material and being of a thinness satisfactory for minimizing current losses, said one sleeve being too thin to be self-supporting, and an electrically insulative bond formed between said sleeve construction and the windings of said stator for sealing the joints of said sleeve construction and securing said sleeves to said windings thereby to provide structural support for said sleeve construction.

3. In an electrical motor driving arrangement a rotor, a cooperating stator, a case, said case including a sleeve construction housing said rotor, said sleeve construction comprising a plurality of jointed sleeves, said sleeves being progressively thinner toward a shim of approximately .005 of an inch thickness forming the middle of said sleeve construction, said shim being pressed into said stator, said shim being formed of a non-magnetic high strength material having high electrical resistivity, and electrically insulating means effective for sealing the joints of said sleeve construction and securing said sleeves to said stator to provide structural support for said sleeve construction.

4. In an electrical motor driving arrangement a rotor, a cooperating stator, a case, said case including a sleeve construction housing said rotor, said sleeve construction comprising a plurality of jointed sleeves, said sleeves being progressively thinner toward a shim of approximately .005 of an inch thickness forming the middle of said sleeve construction, said shim being pressed into said stator, said shim being formed of a non-magnetic high strength material having high electrical resistivity, and an electrically insulative bond formed between said sleeve construction and the windings of said stator for sealing the joints of said sleeve construction and securing said sleeves to said stator windings thereby to provide structural support for said sleeve construction.

5. In an electrical motor driving arrangement, a rotor, a cooperating stator, a case, said case including a sleeve construction housing said rotor, said sleeve construction comprising a plurality of jointed sleeves, said sleeve construction including a shim of approximately .005 of an inch forming the middle of said sleeve construction and a sleeve of approximately .015 of an inch on either side of said shim, said shim being pressed into said stator, said shim being formed of a non-magnetic high strength material having high electrical resistivity, and electrically insulating means effective for sealing the joints of said sleeve construction and securing said sleeves to said stator to provide structural support for said sleeve construction.

6. In an electrical motor driving arrangement, a rotor, a cooperating stator, a case, said case including a sleeve construction housing said rotor, said sleeve construction comprising a plurality of jointed sleeves, said sleeve construction including a shim of approximately .005 of an inch forming the middle of said sleeve construction and a sleeve of approximately .015 of an inch on either side of said shim, said shim being pressed into said stator, said shim at least being formed of a non-magnetic high strength material having high electrical resistivity, and an electrically insulative bond formed between said sleeve construction and the windings of said stator for sealing the joints of said sleeve construction and securing said sleeves to said stator windings thereby to provide structural support for said sleeve construction.

7. In an electrical motor driving arrangement a rotor, a cooperating supported stator, a case, said case including a sleeve construction housing said rotor, said sleeve construction comprising a plurality of jointed sleeves, said sleeves being progressively thinner toward a shim of approximately .005 of an inch thickness forming the middle of said sleeve construction, said shim being pressed into said stator, said shim being formed of a non-magnetic high strength material having high electrical resistivity, and a bond formed between said sleeve construction and the windings of said stator for sealing the joints of said sleeve construction and securing said sleeves to said stator windings thereby to provide structural support for said sleeve construction, said bond being formed by a high strength electrically insulative material that is leak-tight, non-aging and chemically inert.

8. In an electrical motor driving arrangement, a rotor, a cooperating supported stator, a case, said case including a sleeve construction housing said rotor, said sleeve construction comprising a plurality of jointed sleeves, said sleeve construction including a shim of approximately .005 of an inch thickness forming the middle of said sleeve construction and a sleeve of approximately .015 of an inch on either side of said shim, said shim being pressed into said stator, said shim and said sleeves on either side thereof being formed of a non-magnetic high strength material having high electrical resistivity, and a bond formed between said sleeve construction and the windings of said stator for sealing the joints of said sleeve construction and securing said sleeves to said stator windings thereby to provide structural support for said sleeve construction, said bond being formed by a high strength electrically insulative material that is leak-tight, non-aging and chemically inert.

References Cited in the file of this patent

UNITED STATES PATENTS

| | | |
|---|---|---|
| 1,233,569 | Graemiger | July 17, 1917 |
| 2,322,924 | Daiger | June 29, 1943 |
| 2,428,236 | Maxwell | Sept. 30, 1947 |
| 2,541,906 | Anderson | Feb. 13, 1951 |
| 2,573,126 | Andrus | Oct. 30, 1951 |
| 2,654,848 | Schaefer | Oct. 6, 1953 |